United States Patent [19]

Lowe

[11] 3,954,298
[45] May 4, 1976

[54] HEIGHT ADJUSTMENT MECHANISM FOR SUSPENSION SEAT

[75] Inventor: Frederick G. Lowe, Pitsford, England

[73] Assignee: Universal Oil Products Company, Des Plaines, Ill.

[22] Filed: May 21, 1974

[21] Appl. No.: 471,945

[30] Foreign Application Priority Data
May 22, 1973  United Kingdom............... 24450/73

[52] U.S. Cl.................................. 297/308; 297/345; 248/399
[51] Int. Cl.² ........................ B60N 1/02; A47C 3/20
[58] Field of Search.................... 297/307, 308, 345; 248/399, 400, 376, 423

[56] References Cited
UNITED STATES PATENTS

| | | | |
|---|---|---|---|
| 2,291,247 | 7/1942 | McArthur | 297/345 |
| 2,331,990 | 10/1943 | McArthur | 248/423 |
| 2,655,981 | 10/1953 | Whittingham | 297/345 |
| 3,006,593 | 10/1961 | Plate | 248/399 X |
| 3,268,200 | 8/1966 | Eicher | 248/399 |
| 3,480,324 | 11/1969 | Bauer | 248/399 X |
| 3,572,624 | 3/1971 | Holdampf | 248/399 X |
| 3,572,828 | 3/1971 | Lehner | 248/399 |
| 3,574,401 | 4/1971 | Lehner | 297/308 |
| 3,705,745 | 12/1972 | Ambrosius | 248/399 |

FOREIGN PATENTS OR APPLICATIONS 1,930,105  12/1970  Germany............................ 248/419

*Primary Examiner*—Francis K. Zugel
*Attorney, Agent, or Firm*—James R. Hoatson, Jr.; Barry L. Clark; William H. Page, II

[57] ABSTRACT

Height adjustment mechanism for a suspended vehicle seat permits the seat height to be adjusted relative to its supporting frame after the seat has been adjusted for the weight of the occupant. A plate (movable with the suspension) having notches or teeth on one edge is adjustably locked relative to a channel (movable with the seat) in which it can slide by a handle actuated pivoted latch member.

6 Claims, 5 Drawing Figures

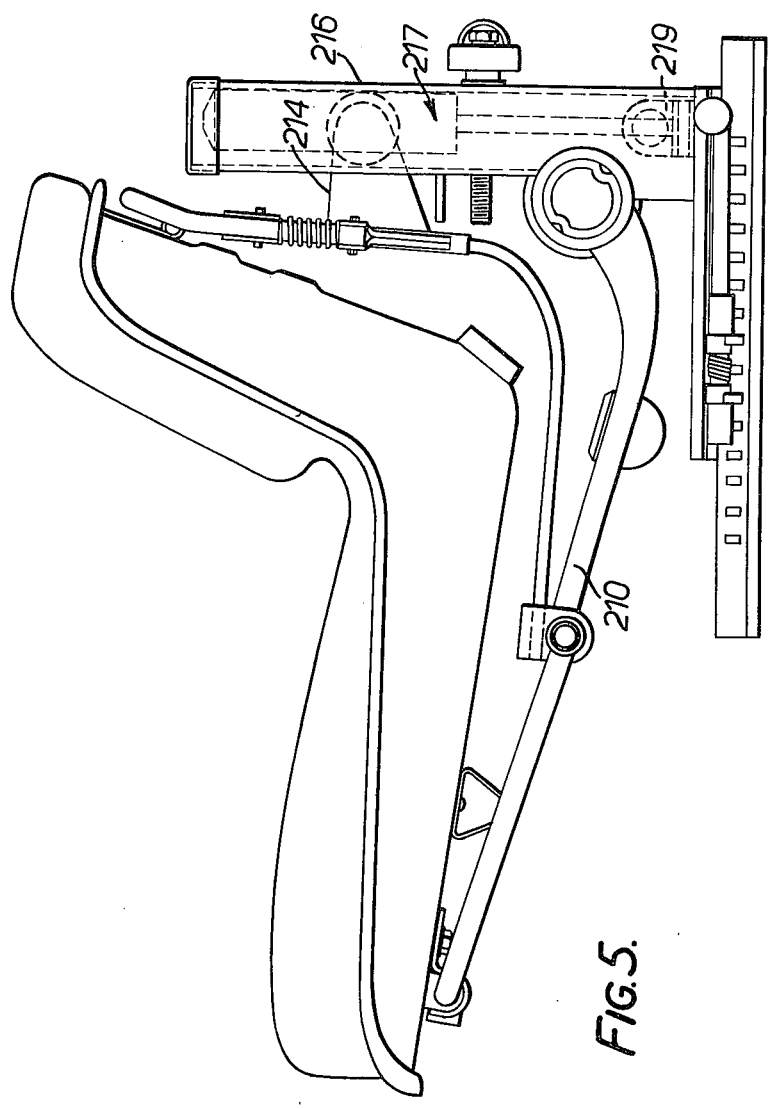

HEIGHT ADJUSTMENT MECHANISM FOR SUSPENSION SEAT

This invention relates to vehicle seats. More particularly the invention relates to a seat which is mounted on a spring suspension for upward and downward movement relative to a base, the seat also being movable upwardly and downwardly relative to the spring suspension to vary the height of the seat to suit the seat occupant.

The present invention provides a vehicle seat comprising a seat part supported on a base part by a spring suspension which permits upward and downward resilient movement of the seat part. The spring suspension comprises a carriage movable along an upwardly-directed guide in the base part, a suspension arm pivoted at one end to a torsion bar on the base part, and a frame interconnecting the outer end of the suspension arm and the carriage for movement together. A height-varying device comprising a slide coupling supports an upper portion of the seat part for upward or downward movement relative to the carriage and includes rack and pawl means for locking the seat part at a selected height relative to the carriage. A lower coupling supports the lower portion of the seat part for upward and downward translational movement, substantially without pivotal movement, relative to the suspension arm to which it is pivotally attached.

A number of embodiments of the invention will be described with reference to the accompanying drawing in which:

FIG. 4 and FIG. 5 are side elevations of two alternative embodiments of the vehicle seat.

Figure 1:
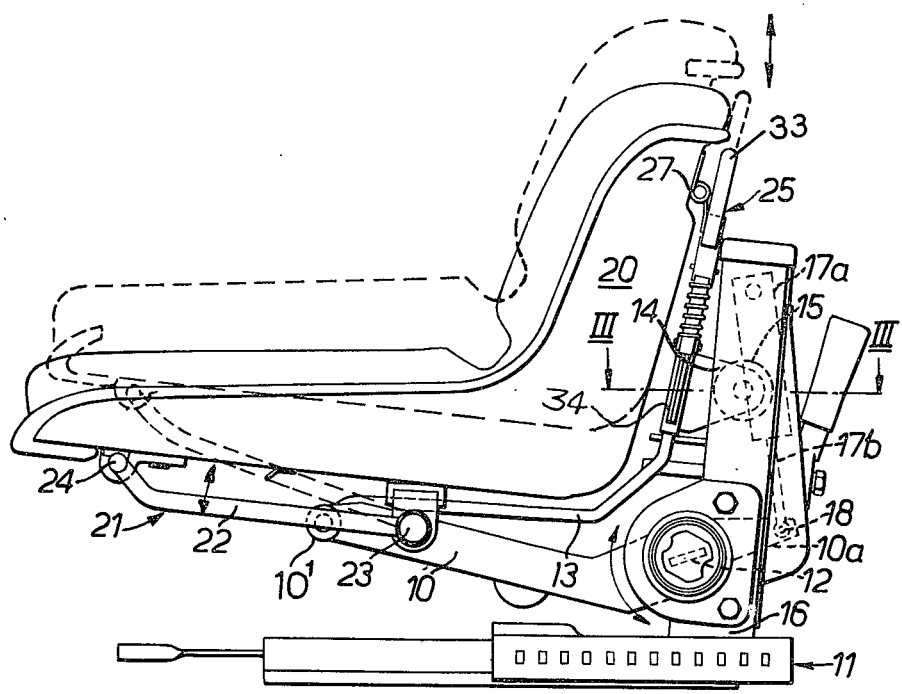
FIG. 1 is a side elevation of a vehicle seat in accordance with the invention showing upper and lower coupling devices for mounting a seat part on a seat suspension for adjustable movement between the solid and dotted line positions shown.
Figure 2:
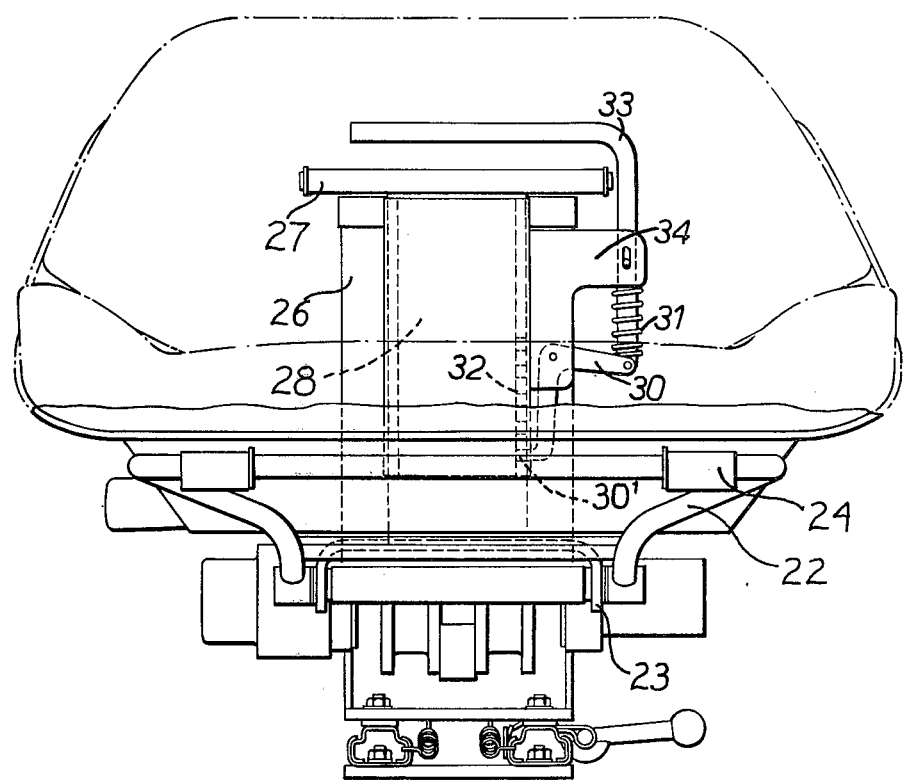
FIG. 2 is a front elevation of the seat of FIG. 1 in which the seat part is indicated in ghost line to reveal the upper coupling device.
Figure 3:
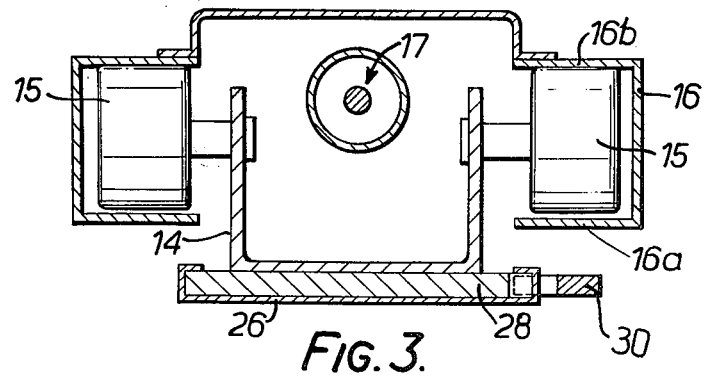
FIG. 3 is a section on the line III—III of FIG. 1.

In the embodiment of the seat shown in FIGS. 1–3 of the accompanying drawings, the seat suspension comprises a suspension arm 10 which is pivotally supported at one end in a base part 11 of the seat for rotation about a horizontal axis, a torsion bar 12 being disposed along this axis and arranged to bias the arm 10 in an upward direction. The outer end 10' of the suspension arm pivotally supports the lower forward end of a seat supporting frame 13 of which the upper end is connected to a U section carriage 14 which is supported on rollers 15 for upward and downward movement within a column 16 forming part of the base part 11 on which the suspension arm 10 is pivotally mounted. This column is of U section which opens in a forward direction, the sides of the U section having inwardly-turned flanges 16a which, with the back wall 16b of the column, form two upright guides in which the rollers 15 can roll to guide the upward and downward movement of the carriage 14. A vibration damper 17 comprises a cylinder/piston arrangement of which the cylinder 17a is hinged within the upper end of the column 16 and a piston rod 17b extends downwardly to a bearing 18 on the outer end of a rearward extension 10a of the seat supporting arm 10.

A seat part 20 itself is mounted on the supporting frame 13 by means of a lower coupling device 21 in the form of a coupling arm 22 pivoted at one end in a bearing 23 on the suspension arm 10 slightly to the rear of the junction 10' of the suspension arm 10 and the seat-supporting shell 13, and connected at its opposite end through a bearing 24 with the forward end of the seat part. The rearward and upper end of the seat part 20 is connected to the rearward part of the frame 13 by means of an upper coupling device 25 which is operable to allow the height of the seat part relative to the seat-supporting frame to be varied. The lower coupling device 21 allows the height of the lower part of the seat to be varied simultaneously by the same amount so that there is substantially no change in the inclination of the seat part. The upper coupling device 25 comprises a shallow trough member 26 hinged at 27 to the back of the seat part, the trough member having inwardly-turned sides and into which a flat plate 28 forming the rearward upper end of the seat-supporting frame 13 is slidably fitted. This plate 28 supports the carriage 14. The trough member 26 carries a bell-crank lever 30 of which one end 30' projects through an aperture in the side of the trough member 26 and is biassed by a spring 31 into engagement in the spaced recesses of a rack 32 formed along one edge of the plate 28. The opposite end of the bell-crank lever 30 is connected to an L-shaped handle 33 which is slidably mounted in a laterally extending bracket 34 on the trough member 26. The trough member is hinged to the back of the seat part at a position 27 close to the top of the seat part so that the L-shaped handle can be grasped by the fingers of a person whose hand is resting on the top of the seat part.

In operation of the seat itself, the torsion bar 12 is preloaded by a screw-operated device (not shown), forming no part of the present invention, to match the weight of the seat occupant so that the seat part 20, under the static load of the seat occupant, comes to rest at a ride position approximately mid-way between UP stop and DOWN stop positions of the seat.

If the seat occupant wishes to raise the height of the seat part relative to the base part, whilst maintaining the seat part mid-way between the UP stop and DOWN stop positions, he will move out of the seat, which will accordingly rise to its UP stop position, and he will then operate the height-adjustment mechanism. To do this, he rests his hand on the upper edge of the seat part 20, squeezes the handle 33 with his fingertips to lift it against the force of spring 31 and withdraw the bell-crank lever 30 from engagement with the rack 32 of the seat-supporting frame 13, thereby releasing the upper coupling device. He then lifts or lowers the seat part 20 to the desired height relative to the seat-supporting frame. Release of the handle 33 permits the spring to force the pawl end 30' of the bell-crank lever back into engagement with a recess on the rack 32 of the seat-supporting frame 13 to lock the upper coupling device in its adjusted position. The movement of the front of the seat part follows the movement of the upper part of the seat part, being supported and guided by the lower coupling device 21, so that the movement of the seat part is translational and substantially without any pivotal movement.

Figure 4:
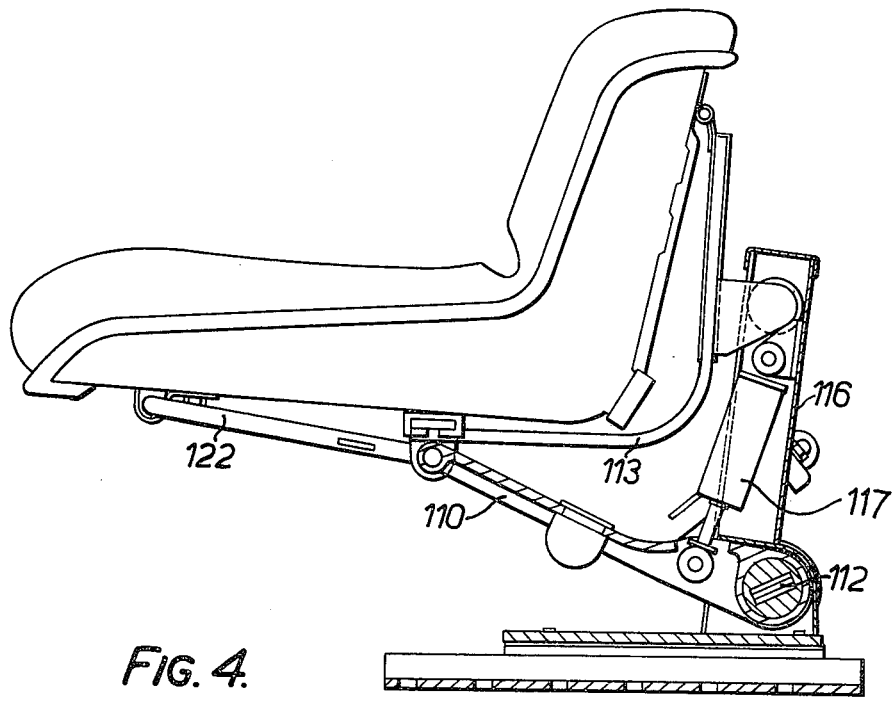

In the modified embodiment of FIG. 4, a seat-supporting arm 110 is pivoted at a rearward position in the column 116, and a vibration damper 117 within the column engages the seat-supporting arm at a position thereon forward of the torsion bar 112. Furthermore, the lower coupling arm 122 and the lower forward end of the seat-supporting frame 113 have a common pivot connection with the seat-supporting arm.

In another modified embodiment, shown in FIG. 5, the seat-supporting arm 210 is pivoted to a substantially vertical column 216, and the cylinder/piston vibration damper 217 is connected between the roller-mounted carriage 214 and a support 219 fixed to the base of the column.

I claim as my invention:

1. A vehicle seat comprising an L-shaped seat part mounted on an L-shaped supporting frame, a spring suspension on which the seat part and supporting frame are mounted for upward and downward translational movement, substantially without pivotal movement, relative to a base part, the supporting frame having a horizontally-directed portion and an upwardly-directed portion extending generally parallel to the direction of upward movement of the seat part and height-varying coupling means between the seat part and the supporting frame which permits the seat part to be raised or lowered and locked at a selected height relative to the supporting frame, the height-varying coupling means comprising a slide coupling located between upper portions of the seat part and supporting frame and movable in the plane of the upwardly-directed portion of the supporting frame and means for locking the slide coupling at a selected position of the seat part relative to the supporting frame, and a coupling arm pivotally connected at one end thereof to a forward portion of the seat part and at its opposite end to a pivot member which moves upwards and downwards with the supporting frame and spring suspension as said supporting frame is moved upwards and downwards by said spring suspension.

2. A vehicle seat according to claim 1 wherein said spring suspension comprises a suspension arm pivoted at one end to said base part, and a carriage movable upwardly and downwardly in a guide in said base part, the supporting frame being secured to said carriage and pivoted to said arm.

3. A vehicle seat comprising a seat part supported on a base part by a spring suspension which permits upward and downward resilient movement of the seat part, the spring suspension comprising a carriage and a roller supporting the carriage for movement along an upwardly-directed rectilinear guide in the base part, a suspension arm pivoted at one end to the base part, a frame interconnecting the outer end of the suspension arm and the carriage for movement together and a height-varying device comprising a slide coupling supporting an upper portion of the seat part for upward or downward movement relative to the carriage along a straight line parallel to said guide with means for locking the seat part at a selected height relative to the carriage and a lower coupling supporting the lower portion of the seat part for upward and downward translational movement, substantially without pivotal movement, relative to the base part.

4. A vehicle seat according to claim 3 wherein the lower coupling comprises a coupling arm pivoted at one end to the seat part and at its opposite end to said suspension arm.

5. A vehicle seat according to claim 3 wherein said slide coupling comprises a slide member movable in a guide member, one of said members being mounted for movement with said seat part and the other being mounted for movement with said carriage, and said locking means comprise a locking detent on one of said members engageable with any selected one of a plurality of recesses of a rack on the other of said members.

6. A vehicle seat according to claim 5 wherein the locking means further comprise a handle mounted on the seat part and connected to the locking detent and operable by an upward pulling force to withdraw the locking detent from said rack.

* * * * *